Figure 1:
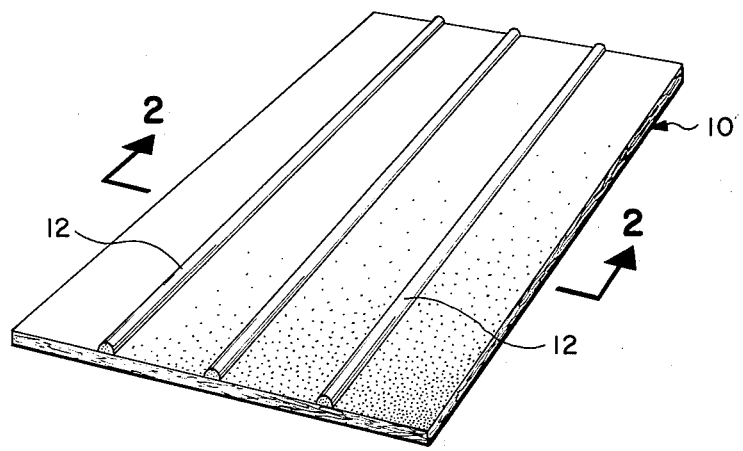

Sept. 7, 1965 G. E. HALL ETAL 3,205,098
CELLULAR-RIBBED BATTERY PLATE SEPARATOR
Filed June 25, 1962

United States Patent Office

3,205,098
Patented Sept. 7, 1965

3,205,098
CELLULAR-RIBBED BATTERY PLATE SEPARATOR
George E. Hall, Concord, David B. Lester, Cambridge, and Harri J. Brax, Winchester, Mass., assignors to W. R. Grace & Co., Cambridge, Mass., a corporation of Connecticut
Filed June 25, 1962, Ser. No. 204,890
4 Claims. (Cl. 136—145)

This invention relates to plate separators for lead-acid storage batteries. In particular, it relates to battery separators provided with a plurality of spaced parallel ribs which are composed of a resilient cellular material.

Essentially, storage batteries of the lead acid-type consist of a container filled with dilute sulphuric acid in which positive and negative plates are immersed. The plates are composed of grids cast from lead or a lead alloy and filled with active material. The active material is applied in the form of a paste which is made by mixing lead oxide with water and sulphuric acid in amounts necessary to obtain a stiff but workable paste. The density of the paste is generally of the order of about 70 to 75 grams per cubic inch.

When the positive and negative plates are assembled in the battery, they are kept from direct electrical contact by means of separators. The separators are electrical insulators which have sufficient porosity to retain acid and allow electric current to flow between the plates when carried by the sulphuric acid but do not permit electricity to pass directly therebetween.

An important cause of battery failure is the effect of vibration to which the battery is normally subjected in the course of its service. Unless the components are tightly packed in the battery container, the metallic plates will abrade against the separators with the result that continued abrasion will form holes in the separators. Frequently, the holes are of such size as to permit metallic conduction between the plates with consequent short circuiting. In addition, severe jarring causes shedding of paste particles which reduces the capacity of the battery due to the fact that contact is lost between the paste and grid.

Battery plates and separators may vary slightly in thickness within limits of tolerances accepted by the industry. In addition, battery containers do not always have the same interior dimensions. Consequently, when the battery components are assembled into the container, a variable degree of looseness exists. To compensate for such variations, it has been the practice of battery manufacturers to insert thin shims between the outside plates and the container walls to ensure a tight assemblage. This practice, however, is not altogether satisfactory because the battery manufacturer may not have at his disposal shims of the exact thickness to make the necessary adjustments. In addition, the degree as to how tightly the battery components should be packed is left to the discretion of individual operators. Since a human factor is involved, no two operators will adjust to the same degree in all situations.

It is, therefore, an object of this invention to provide a singular corrective means to ensure a tight assemblage of battery components at all times. The invention comprises a plate separator composed of a panel having a plurality of resilient cellular ribs affixed in spaced parallel relationship to at least one side of the panel. The resiliency of the cellular ribs minimizes plate movements during extreme vibration by exerting constant pressure on the plate. Any plate movement which may occur in the battery during service conditions is immediately compensated for by contraction of the ribs on one separator with a corresponding expansion of ribs on another separator.

Figure 2:
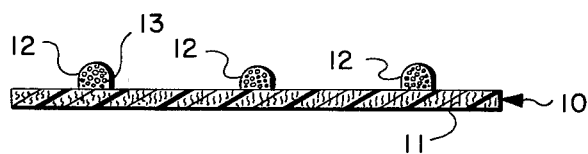

In the drawing:
FIGURE 1 is a perspective view of the rigged separator of this invention.
FIGURE 2 is a cross section of the separator taken on line 2—2 of FIGURE 1 and illustrates the cellular structure of the ribs.

In the figures, the numeral 10 indicates a panel made of any material which is used to prepare separators, such as an impregnated cellulosic web 11, and the numeral 12 represents the ribs comprised of a multiplicity of voids 13.

In making the improved separators of this invention, a panel member is first provided. Any dimensionally-stable material which will not conduct electricity but will permit passage of electrolytes and is inert in the environment of a lead-acid cell is suitable for use as a panel. A particularly effective panel is one comprised of a cellulosic material impregnated with a phenol-aldehyde resin, such as phenol-formaldehyde, and cured to an infusible state. Such materials are well known and are described in U.S. Patent No. 2,810,775.

The cellular rib is formed of a plasticized acid-resistant thermoplastic resin composition containing a certain amount of a finely-divided blowing agent intimately dispersed therein. When fluxed, the composition produces a resilient rib which is composed of a myriad of substantially uniform and predominantly closed non-communicating cells. The uniformity of the cells and their non-communicating relationship provide ribs which respond uniformly to vibratory pressures. Irregular and intercommunicating cells give weak ribs which are apt to collapse under service conditions. Rigid ribs, even through cellular, are not effective. Accordingly, the resin which is used to form the ribs must be one which when fluxed is characterized with resilient properties.

Plasticized vinyl chloride resin compositions are particularly suitable as the rib-forming material although other acid-resistant thermoplastic resins may be used. These include polyvinyl acetate, polyvinyl butyrate, copolymers of vinyl chloride and vinyl acetate, polyvinyl alcohol, polyvinylidene chloride, and copolymers of vinylidene chloride and a vinyl aromatic compound, such as styrene. The preferred resin is plasticized polyvinyl chloride which may be applied as a plastisol or a dry blend.

The plasticizer employed may be of any of the well-known non-volatile plasticizers for vinyl resins which solvate the resin at elevated temperatures. These include such primary plasticizers as dioctyl phthalate, diisooctyl phthalate, dodecyl phthalate di(n-octyl, n-decyl) phthalate, acetyl tributyl citrate, dioctyl sebacate, dihexyl adipate, 2-ethylhexyl diphenyl phosphate, and tricresyl phosphate. Secondary plasticizers, such as petroleum residue products commonly used as rubber softeners and plasticizers (Mobilsol L), may be used to supplement or replace a part of the primary plasticizer. The total amount of plasticizer used should be sufficient to provide the ribs with the desired degree of resiliency. In plastisol formulations, the percentage of plasticizer may range between about 60 to 120 percent, and in dry blends the percentage may range between about 20 to 60 percent. The percentages are based on the weight of the vinyl resin.

The blowing agents are employed in a finely divided state in the range of about 1 to 3 microns. They are so selected that their decomposition temperatures are slightly below the final fluxing temperature of the vinyl resin composition. A difference between maximum fluxing temperature and decomposition of the blowing agent of about 15° to 30° C. is satisfactory. By so choosing the blowing agent, it is possible to produce expansion when the resin composition is in a fairly tough gel state, i.e., when it is not so fluid that blowing will cause perforations in the surface of the mass nor so well gelled as to prevent proper expansion of gas. There are numerous blowing agents which are suitable for developing the proper cell structure in the ribs. Among those which can be used are azodicarbonamide, 3,3'-disulphonhydrazido diphenylsulfone, dinitrosopentamethylene tetramine, diazoaminobenzene, p,p'-oxybis(benzene sulfonyl hydrazide), sodium carbonate, ammonium carbonate and ammonium bicarbonate. The nitrogen-evolving compounds are particularly suitable. The quantity of blowing agent may vary from between about ½ to 10 percent based on the weight of the resin. Good cell formation is realized when 2 to 5 percent is used in plastisol formulations and ½ to 1 percent in dry blends.

In addition to the resin, plasticizer and blowing agent, various other additives may be included to modify the rib-forming compositions. These include fillers, such as anhydrous calcium sulfate, talc, wood flour, diatomaceous earth and asbestos, stabilizers, such as tetrasodium pyrophosphate, tribasic lead silicate sulfate, calcium stearate, zinc stearate, dibasic lead stearate, organo-tin complexes, epoxy resins and epoxidized oils; pigments, such as carbon black, titanium dioxide and aluminum powder; and dispersing agents, such as zinc resinate, lecithin, glycol stearate, propylene glycol laurate and glycerol monooleate.

The method by which the rib-forming resin composition is formulated is not significant. Any method may be used so long as the components are thoroughly mixed. A satisfactory method for preparing a plastisol is to first grind the blowing agent with a small amount of plasticizer and then gradually add the remaining ingredients and remaining plasticizer with thorough mixing at room temperature.

Representative rib-forming compositions are illustrated in Examples I and II:

Example I

Several plastisols were prepared by mixing the following ingredients in the same amounts indicated in each formulation:

| | Parts by weight |
|---|---|
| Polyvinyl chloride | 34 |
| Plasticizer (dioctyl phthalate) | 23 |
| Extruder plasticizer (Mobilsol L) | 9 |
| Filler (anhydrous calcium sulfate) | 32.28 |
| Stabilizer (tetrasodium pyrophosphate) | 1.1 |
| Dispersing agent (zinc resinate) | 0.6 |
| Coloring agent (carbon black) | 0.02 |

Each of the several plastisol formulations were varied by the addition of between about ½ percent to 2 percent, based on the weight of the resin, of a blowing agent. The specific blowing agents used were p,p'-oxybis(benzene sulfonyl hydrazide) and azodicarbonamide.

Instead of plastisols, dry blend formulations may be used as the rib-forming compositions. Two of such formulations prepared by conventional dry blending techniques are illustrated in Example II:

Example II

| | Formulation (Parts by weight) | |
|---|---|---|
| | A | B |
| Polyvinyl chloride | 42.4 | 75 |
| Filler (anhydrous calcium sulfate) | 34.0 | 0 |
| Plasticizer (dioctyl phthalate) | 19.2 | 18.9 |
| Stabilizer (tribasic lead silicate sulfate) | 2.1 | 3.8 |
| Lubricant stabilizer (dibasic lead stearate) | 2.1 | 1.9 |
| Blowing agent (azodicarbonamide) | 0.2 | 0.4 |

The complete separators may be made in a number of ways. In one method, the plastisol, such as described in Example I, may be extruded at low pressure and room temperature in a plurality of spaced strips onto a suitable panel. The material used as the panel member is preferably comprised of a cellulosic web or paper which has been impregnated with a phenol-formaldehyde resin and given a partial cure by passing over a heated drum. After the strips of plastisol have been disposed onto the panel, the so-assembled separator is passed into a circulating air jet oven with an air temperature of between about 250° to 320° C. in order to flux the plastisol and complete the cure of the phenol-formaldehyde resin. About 20 to 60 seconds is sufficient to effect complete fluxing and curing. The blowing agent is activated during the heating step whereby the cell structure of the ribs is developed.

Another method of applying the ribs to the separator involves passing a thin stream of plastisol at low pressure and room temperature onto a panel to serve as an adhesive. Thereafter, a plastic compound is extruded as a strand and guided directly onto the ribbon of adhesive. The plastic compound, before extrusion, may be in the form of granules of prefluxed compound, or as a dry blend as illustrated by the composition of Example II. The dry blend composition is extruded at 150° to 180° C. and the blowing agent does not expand the rib until the plastic emerges from the die because of the internal pressures in the extruder. The plastisol adhesive is fluxed by passage through an oven operating at a temperature ranging between about 250° to 320° C.

Another method involves feeding a plastisol composition into a bank of spaced nozzles which distribute the composition to one side of a panel moving below the nozzles. The assembly is then passed to an oven for fluxing of the plastisol and activation of the blowing agent.

It is also within the scope of this invention to apply ribs to both sides of a panel by any method described. Effective separators include those in which the panel has a thickness ranging between .025 to .035 inch, the rib thickness ranges between .020 to .175 inch, and the apparent density of the rib ranges between 0.6 to 1.0.

We claim:
1. An acid-resistant plate separator for storage batteries comprising a panel of a cellulosic material impregnated with a thermoset polymer and a plurality of spaced, resilient, cellular ribs comprised of a blown and fluxed plasticized thermoplastic resin, said ribs being affixed to at least one side of said panel.

2. A separator according to claim 1 wherein the thermoset polymer is phenol-formaldehyde and the thermoplastic resin is polyvinyl chloride.

3. A separator according to claim 1 wherein the cellular ribs are derived from a vinyl resin composition containing ½ to 10 percent of a blowing agent based on the weight of the resin.

4. An acid-resistant plate separator for storage batteries comprising a panel and a plurality of spaced resilient cellular ribs affixed to at least one side of said panel, said ribs being comprised of a blown and fluxed plasticized thermoplastic resin.

References Cited by the Examiner

UNITED STATES PATENTS 2,681,377  6/54  Smithers _____ 136—145
3,036,143  5/62  Fisher et al. _____ 136—146

JOHN H. MACK, Primary Examiner.